United States Patent
Chiu et al.

(10) Patent No.: US 10,429,064 B2
(45) Date of Patent: Oct. 1, 2019

(54) SYSTEM, METHOD AND APPARATUS FOR CONTROLLING THE FLOW DIRECTION, FLOW RATE AND TEMPERATURE OF SOLIDS

(71) Applicant: GENERAL ELECTRIC TECHNOLOGY GMBH, Baden (CH)

(72) Inventors: Jonq-Hai Chiu, West Hartford, CT (US); Herbert E. Andrus, Jr., Granby, CT (US); Christoph Herbert Weingaertner, Gau-Algesheim (DE); Hans-Peter Dornik, Oberramstadt (DE); Olaf Stallmann, Essenheim (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 577 days.

(21) Appl. No.: 15/086,821

(22) Filed: Mar. 31, 2016

(65) Prior Publication Data

US 2017/0284660 A1  Oct. 5, 2017

(51) Int. Cl.
*F23C 10/28* (2006.01)
*F23C 10/22* (2006.01)
(Continued)

(52) U.S. Cl.
CPC ............. *F23C 10/28* (2013.01); *B01J 8/0055* (2013.01); *B01J 8/1809* (2013.01); *B01J 8/1836* (2013.01);
(Continued)

(58) Field of Classification Search
CPC ................................ F23C 10/22; F23C 10/28
(Continued)

(56) References Cited

U.S. PATENT DOCUMENTS

| | | | | |
|---|---|---|---|---|
| 4,349,969 A | * | 9/1982 | Stewart | F23C 10/26 110/245 |
| 4,453,495 A | * | 6/1984 | Strohmeyer, Jr. | F22B 31/0076 110/245 |

(Continued)

FOREIGN PATENT DOCUMENTS

| EP | 2 239 500 A2 | 10/2010 |
|---|---|---|
| EP | 2 884 163 A1 | 6/2015 |

(Continued)

OTHER PUBLICATIONS

Fan, L.S., "Chemical Looping Technology," Department of Chemical and Biomolecular Engineering, pp. 1-16 (Apr. 16, 2014).

(Continued)

*Primary Examiner* — Steven B McAllister
*Assistant Examiner* — Desmond C Peyton
(74) *Attorney, Agent, or Firm* — Grogan, Tuccillo & Vanderleeden, LLP

(57) ABSTRACT

An apparatus for controlling flow of a material includes an inlet for receiving the material from a source, and a seal mechanism connected to the inlet, the seal mechanism having a fluidizing bed configured to receive the material from the inlet, a first discharge passageway and a second discharge passageway. The fluidizing bed includes a first transport zone associated with the first discharge passageway and a second transport zone associated with the second discharge passageway, wherein the first and second transport zones are configured to receive transport gas from a transport gas source. The transport gas is controllable to selectively divert a flow of the material into the first discharge passageway and the second discharge passageway.

19 Claims, 5 Drawing Sheets

(51) Int. Cl.
*F23C 10/20* (2006.01)
*F23C 10/26* (2006.01)
*F23C 10/10* (2006.01)
*F23C 10/00* (2006.01)
*B01J 8/18* (2006.01)
*B01J 8/36* (2006.01)
*B01J 8/00* (2006.01)
*B01J 8/38* (2006.01)

(52) U.S. Cl.
CPC .............. *B01J 8/36* (2013.01); *F23C 10/002* (2013.01); *F23C 10/10* (2013.01); *F23C 10/20* (2013.01); *F23C 10/22* (2013.01); *F23C 10/26* (2013.01); *B01J 2208/00061* (2013.01); *B01J 2208/00371* (2013.01); *B01J 2219/002* (2013.01); *B01J 2219/00213* (2013.01); *B01J 2219/00238* (2013.01); *F23C 2206/103* (2013.01); *F23C 2900/10008* (2013.01)

(58) Field of Classification Search
USPC ......... 431/7; 122/1 R, 4 D; 110/348; 60/648; 422/141, 145, 146, 147
See application file for complete search history.

(56) References Cited

U.S. PATENT DOCUMENTS

| | | | |
|---|---|---|---|
| 4,469,050 A | | 9/1984 | Korenberg |
| 4,709,663 A | * | 12/1987 | Larson ..................... B01J 8/388 110/245 |
| 4,779,574 A | * | 10/1988 | Nilsson ................... F23C 10/16 122/1 R |
| 4,813,479 A | * | 3/1989 | Wahlgren ............... B01J 8/1809 110/245 |
| 4,856,460 A | * | 8/1989 | Wied ....................... B01J 8/005 122/4 D |
| 4,955,295 A | | 9/1990 | Abdulally |
| 4,969,930 A | * | 11/1990 | Arpalahti .................. C10J 3/54 110/347 |
| 5,069,170 A | * | 12/1991 | Gorzegno ........... F22B 31/0084 110/245 |
| 5,069,171 A | * | 12/1991 | Hansen ............... F22B 31/0084 110/245 |
| 5,133,943 A | * | 7/1992 | Abdulally ........... F22B 31/0084 110/216 |
| 5,140,950 A | * | 8/1992 | Abdulally .................. B01J 8/26 110/245 |
| 5,141,708 A | | 8/1992 | Campbell, Jr. et al. |
| 5,273,000 A | * | 12/1993 | Regan ................. F22B 31/0084 122/4 D |
| 5,275,788 A | * | 1/1994 | Stoholm ................ B01J 8/1854 110/245 |
| 5,442,919 A | | 8/1995 | Wilhelm |
| 5,463,968 A | * | 11/1995 | Abdulally ........... F22B 31/0084 110/245 |
| 5,537,941 A | * | 7/1996 | Goidich ............. F22B 31/0084 110/216 |
| 5,809,912 A | * | 9/1998 | Hansen ............... F22B 31/0084 110/245 |
| 6,253,552 B1 | * | 7/2001 | Peletz, Jr. ............. F01K 25/065 60/649 |
| 8,807,053 B2 | * | 8/2014 | Kauppinen ......... F22B 31/0092 110/216 |
| 9,163,830 B2 | | 10/2015 | Chiu et al. |
| 9,423,122 B2 | * | 8/2016 | Kauppinen ......... F22B 31/0092 |
| 2009/0293818 A1 | * | 12/2009 | Kauppinen ......... F22B 31/0092 122/4 D |
| 2016/0195265 A1 | * | 7/2016 | Chiu ...................... B01J 8/0025 431/7 |
| 2017/0284660 A1 | * | 10/2017 | Chiu ...................... F23C 10/002 |

FOREIGN PATENT DOCUMENTS

| | | |
|---|---|---|
| WO | 2007/128883 A2 | 11/2007 |
| WO | 2008/071842 A1 | 6/2008 |
| WO | 2010/052372 A1 | 5/2010 |
| WO | 2012/113985 A1 | 8/2012 |

OTHER PUBLICATIONS

International Search Report and Written Opinion issued in connection with corresponding PCT Application No. PCT/EP2017/057092 dated Jun. 20, 2017.

* cited by examiner

SYSTEM, METHOD AND APPARATUS FOR CONTROLLING THE FLOW DIRECTION, FLOW RATE AND TEMPERATURE OF SOLIDS

BACKGROUND

Technical Field

Embodiments of the invention relate generally to power generation and, more particularly, to a system, method and apparatus for controlling the flow direction, flow rate, and temperature of solids utilized in a power generation process.

Discussion of Art

Fluidized bed combustion (FBC) is a combustion technology used in power plants, primarily to burn solid fuels. FBC power plants are more flexible than conventional power plants in that they can be fired on coal, coal waste or biomass, among other fuels. The term FBC covers a range of fluidized bed processes, including circulating fluidized bed (CFB) boilers, bubbling fluidized bed (BFB) boilers and other variations thereof. In an FBC power plant, fluidized beds suspend solid fuels on upward-blowing jets of gas during the combustion or chemical reaction process in a combustor, causing a mixing of gas and solids. The fluidizing action, much like a bubbling fluid, provides a means for effective chemical reactions and heat transfer in the combustor.

During the combustion process of fuels which have a sulfur-containing constituent, e.g., coal, sulfur is oxidized to form primarily gaseous $SO_2$. In particular, FBC reduces the amount of sulfur emitted in the form of $SO_2$ by a desulfurization process. A suitable sorbent, such as limestone containing $CaCO_3$, for example, is used to absorb $SO_2$ from flue gas during the combustion process. In order to promote both combustion of the fuel and the capture of sulfur, FBC power plants operate at temperatures lower than conventional combustion plants. Specifically, FBC power plants typically operate in a range between about 850° C. and about 900° C. Since this allows coal to combust at cooler temperatures, $NO_x$ production during combustion is lower than in other coal combustion processes.

To further increase utilization of the fuel and efficiency of sulfur capture, a cyclone separator is typically used to separate solids, e.g., unutilized fuel and/or limestone, entrained in flue gas leaving the combustor. The separated solids are then returned to the combustor via a recirculation means, e.g., a recirculation pipe, to be used again in the combustion process. A sealpot, sometimes referred to as a "j-leg," maintains a seal between the combustor and the cyclone separator to prevent unwanted escape of flue gas from the combustor backward, e.g., in a direction opposite to flow of the separated solids into the combustor, through the recirculation pipe.

In connection with the above, air systems in an FBC power plant are designed to perform many functions. For example, air is used to fluidize the bed solids consisting of fuel, fuel ash and sorbent, and to sufficiently mix the bed solids with air to promote combustion, heat transfer and reduce emissions (e.g., $SO_2$, CO, $NO_x$ and $N_2O$). In order to accomplish these functions, the air system is configured to inject air, designated primary air (PA) or secondary air (SA), at various locations and at specific velocities and quantities.

In addition, fluidizing air or gas and transport air or gas are typically supplied to the sealpot to facilitate the flow of solids and gas through the sealpot, as disclosed in U.S. Pat. No. 9,163,830, which is hereby incorporated by reference herein in its entirety. In particular, as is known in the art, solids from the chemical process that move downward through a feedpipe into the sealpot from the cyclone separator are fluidized by the fluidizing air or gas. The fluidized solids are then transported to a discharge pipe by the fluidizing and/or transport air or gas and ultimately back to the combustor. Thus, the sealpot forms a seal, thereby preventing flue gases in the combustor from flowing backward through the sealpot, e.g., upward through the feedpipe back into the cyclone, as is known in the art.

More recently, sealpots have also found use in chemical looping systems. Chemical looping systems utilize a high temperature process, whereby solids such as calcium or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal. After a reduction reaction in the reducer, the solid products with some un-reacted solids are returned to the oxidizer to be oxidized again, and the cycle repeats. In such systems, a sealpot may be utilized to prevent a pressure differential that could cause backflow, as discussed above. For example, a sealpot may be utilized in between the output of the oxidizer and the input of the reducer to provide a flow of oxidized solids to the reducer and prevent backflow therefrom.

In both types of systems, the flow rate and temperature of the solids entering the combustor/reducer (e.g., coal in a traditional FBC system, and limestone/calcium oxide, or metal oxide, in a system that incorporates chemical looping) are important parameters that affect chemical reactions. In particular, the temperature of the circulating solids must often be reduced prior to entering the reactor in order to ensure a desired level of chemical reaction.

In view of the above, while the design of existing sealpots is generally suitable for controlling a flow of solids along a single pathway and preventing backflow, control of the flow rate and the temperature of such solids, as well as control of the flow of solids along multiple paths, remains challenging and inefficient. Accordingly, there is a need for an integrated system and apparatus that provides for more precise and flexible control of the flow direction, flow rate, and temperature of solids.

BRIEF DESCRIPTION

In an embodiment, an apparatus for controlling material flow is provided. The apparatus includes an inlet for receiving the material from a source, and a sealpot connected to the inlet, the sealpot having a fluidizing bed configured to receive the material from the inlet, a first discharge passageway and a second discharge passageway. The fluidizing bed includes a first transport zone associated with the first discharge passageway and a second transport zone associated with the second discharge passageway, wherein the first and second transport zones are configured to receive transport air or gas from a transport air or gas source. The transport air or gas is controllable to selectively divert a flow of the material into the first discharge passageway and the second discharge passageway.

In another embodiment, an apparatus for controlling solids flow in a solid transport system is provided. The apparatus includes a solids feed-pipe having an upper end which receives solids from an upstream flow, and a lower end, a bed fluidly coupled to the lower end of the solids feed-pipe and configured to receive the solids from the solids feed-pipe, the bed including a first transport zone and a second transport zone, each transport zone being configured to receive fluidizing gas from a gas source, a first discharge passageway adjacent to the first transport zone, and a second discharge passageway adjacent to the second transport zone. Fluidized solids are transported to the first discharge passageway and the second discharge passageway using the fluidizing gas supplied to the first and second transport zones.

In yet another embodiment, a method of controlling solids flow is provided. The method includes the steps of receiving solids at a bed from a source, fluidizing the solids in the bed using a gas, and selectively transporting the fluidized solids to a first discharge passageway and a second discharge passageway by controlling a supply of fluidizing gas to a first fluidizing zone of the bed associated with the first discharge passageway and a second fluidizing zone of the bed associated with the second discharge passageway.

DRAWINGS

The present invention will be better understood from reading the following description of non-limiting embodiments, with reference to the attached drawings, wherein below:

DETAILED DESCRIPTION

Figure 1:
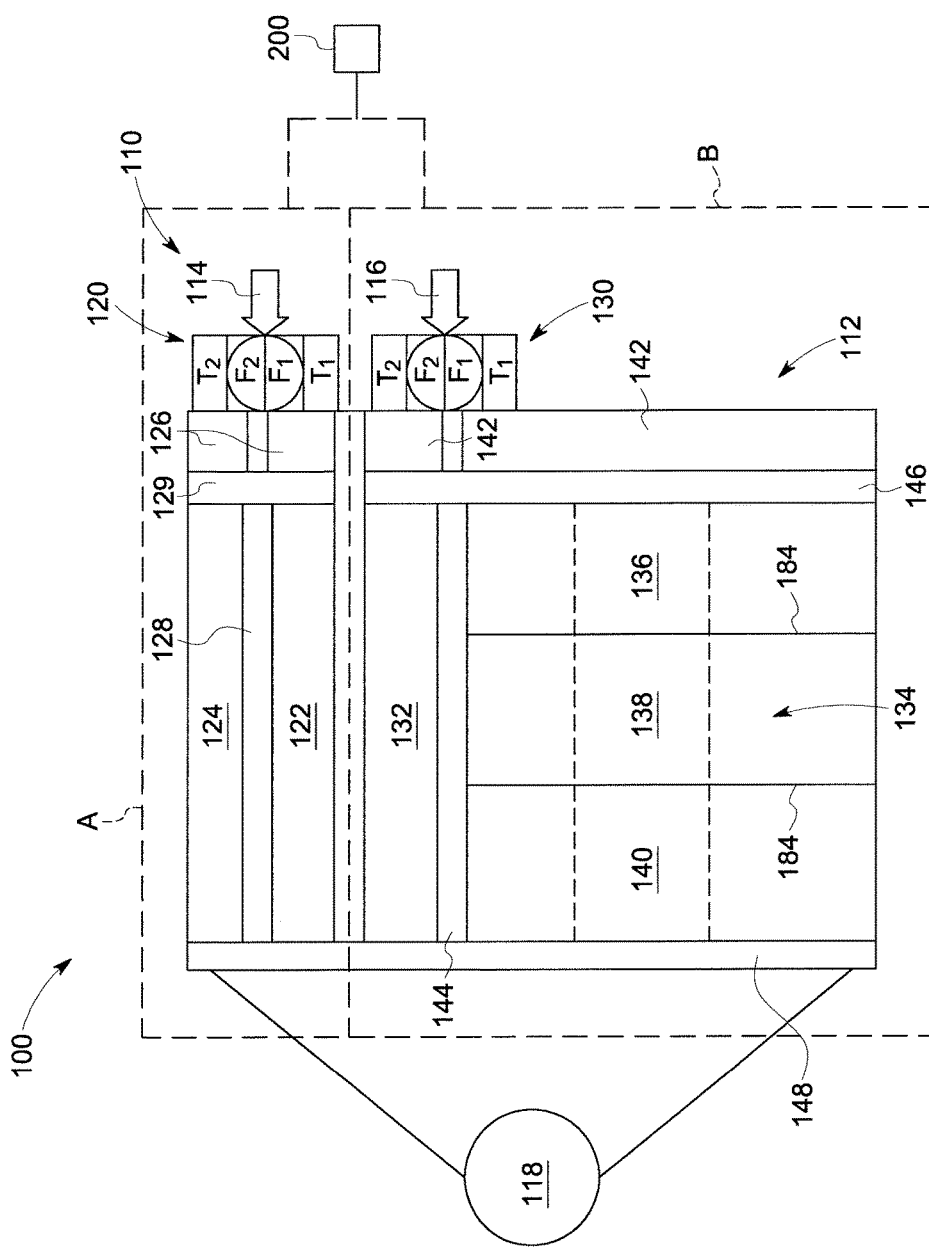
FIG. 1 is a schematic illustration of an integrated system for controlling the flow direction, flow rate and temperature of solids according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with chemical reaction processes such as fluidized bed combustion and/or chemical looping, embodiments of the invention may also be applicable for use in other types of chemical process systems and processes, including power generation. In addition, it is contemplated that embodiments of the invention may be utilized in any system where control over the flow direction, flow rate and temperature of a material is desired, including systems not related to power generation.

As used herein, "operatively coupled" refers to a connection, which may be direct or indirect. The connection is not necessarily a mechanical attachment. As used herein, "communication" means that two or more components are connected in such a manner to allow for the propagation of signals between such components, such as, but not limited to, through wires/cables, fiber optics, and wireless transmitters/receivers. As used herein, "fluidly coupled" or "fluid communication" refers to an arrangement of two or more features such that the features are connected in such a way as to permit the flow of fluid between the features and permits fluid transfer.

As used herein, "solids" refers to solid particles intended for use in a chemical reaction process such as, for example, coal particles. "Materials" as used herein, refers generally to non-liquid and non-gas materials, such as solid particles and the like, regardless of their intended use.

Embodiments of the invention relate to a system, method and apparatus for controlling the flow direction, flow rate and/or temperature of solids. Referring to FIG. 1, an integrated direction, flow rate and temperature control apparatus 100 according to an embodiment of the invention is illustrated. The apparatus 100 includes first and second control subassemblies 110, 112 each having a separate inlet for receiving first and second flows 114, 116 of solids from first and second sources (e.g., from respective cyclone separators of separate combustors), and a common outlet 118. Other than sharing a common outlet 118, the control subassemblies 110, 112 can be fluidly separated from one another such that solids entering one of the inlets are not permitted to mix with solids entering the other of the inlets other than at the outlet 118. In other embodiments, the solids entering the respective control subassemblies 110, 112 may exit at separate outlets. In other embodiments, each flowpath of the respective control subassemblies 110, 112 (as discussed hereinafter) may have its own, dedicated outlet.

As further shown in FIG. 1, the first control subassembly 110 includes a first seal mechanism 120 fluidly coupled to the inlet, a bypass pathway 122 and a heat exchange pathway 124. The bypass pathway 122 and the heat exchange pathway 124 are fluidly coupled to the seal mechanism 120 and to the outlet 118 and are configured to receive a flow of solids from the seal mechanism 120 and to direct the solids to the outlet 118 or other downstream paths, as discussed in detail hereinafter. In an embodiment the first control subassembly 110 may also include an empty chamber 126 intermediate the seal mechanism 120 and the bypass pathway 122 and heat exchange pathway 124. In an embodiment, a weir 128 separates the bypass pathway 122 from the heat exchange pathway 124, and a weir 129 divides the empty chamber 126 from the pathways 122, 124. In an embodiment, the weir 128 is configured as a wall that prevents solids from flowing between the bypass pathway 122 and the heat exchange pathway 124.

Similarly, the second control subassembly 112 includes a second seal mechanism 130 fluidly coupled to the inlet, a bypass pathway 132 and a heat exchange pathway 134. The bypass pathway 132 and the heat exchange pathway 134 are fluidly coupled to the seal mechanism 130 and to the outlet 118 and are configured to receive a flow of solids from the seal mechanism 130 and to direct the solids to the outlet 118, as discussed in detail hereinafter. As illustrated in FIG. 1, the heat exchange pathway 134 of the second subassembly includes 112 a plurality of heat exchange chambers 136, 138, 140. Although three separate heat exchange chambers 136, 138, 140 are illustrated, more or fewer heat exchanger chambers may be utilized without departing from the broader aspects of the present invention. In an embodiment the second control subassembly 112 may also include an empty chamber 142 intermediate the seal mechanism 130 and the bypass pathway 132 and heat exchange pathway 134. In an embodiment, a weir 144 separates the bypass pathway 132 from the heat exchange pathway 134, and a weir 146 divides the empty chamber 142 from the pathways 132, 134. As also shown therein, a weir 148 may also be positioned adjacent to the outlet 118 downstream from the pathways of each control subassembly. As with weir 128, weir 144 is configured as a wall that prevents solids from flowing between the bypass pathway 132 and the heat exchange pathway 134.

Figure 2:
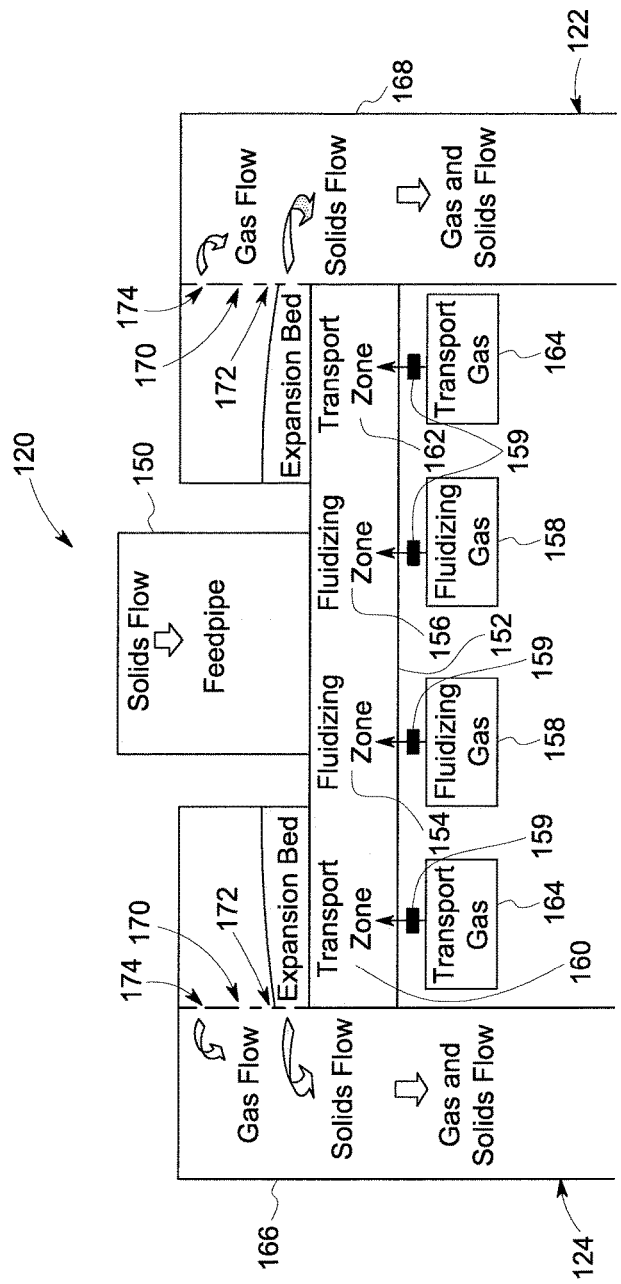
FIG. 2 is a schematic illustration of a seal mechanism of the system of FIG. 1.

Referring now to FIG. 2, the configuration of the first seal mechanism 120 is illustrated. Second seal mechanism 130 is similarly configured, however, only first seal mechanism 120 is shown for purposes of simplification. In an embodiment, the seal mechanisms 120, 130 are generally similar to that disclosed in U.S. Pat. No. 9,163,830 (which is incorporated by reference herein in its entirety) and operate to move solids therethrough in a generally similar manner. As shown in FIG. 2, a solids flow feedpipe 150 defines the first inlet for receiving the first flow 114 of solids. The feedpipe 150 receives solids from, for example, a solids separator (not shown) such as a cyclone separator, but is not limited thereto in certain embodiments. The feedpipe 150 supplies the solids to a dual fluidizing and/or transport bed 152 of the seal mechanism 120.

First and second fluidizing zones 154, 156 are supplied with a fluidizing gas, such as fluidizing air, for example, from a fluidizing gas source 158. In an embodiment, the fluidizing gas source 158 may be a single gas source configured to selectively provide a flow of fluidizing gas to both zones 154, 156, although separate gas sources are also possible. Alternatively (or additionally), first and second transport zones 160, 162 of the fluidizing/transport bed 152 are supplied with a transport gas, e.g., transport gas, supplied from a transport gas source 164. In an embodiment, the transport gas source 164 may be a single gas source configured to selectively provide a flow of transport gas to both zones 160, 162, although separate gas sources are also possible. Further, in an embodiment, the fluidizing gas source 158 and the transport gas source 164 may be separate components, as shown in FIG. 2, or, alternatively, may be included in a single gas source (not shown). In an embodiment, each of the transport zones or fluidizing zones (or the supply conduits leading to each zone) may be configured with a flow control device such as a damper or valve 159 that is selectively controllable/adjustable in order to regulate the flow of gas to the respective transport zone or fluidizing zone, for the reasons discussed hereinafter.

As further shown in FIG. 2, discharge pipes or passageways 166, 168 are connected to the fluidizing/transport bed 152 in an area substantially corresponding to the transport zones 160, 162 of the bed 152. An orifice plate 170, similar to that disclosed in the '830 patent, is disposed between each discharge pipe 166, 168 and the fluidizing/transport bed 152. Each orifice plate 170 has a plurality of apertures 172 which limits solids (prevents a surge of solids flow) and allows fluidized solids being transported from the fluidizing/transport bed 152 to the respective discharge pipes 166, 168.

The plurality of apertures of the orifice plate 170 can be disposed at a height above the fluidizing/transport bed 152 and include at least one solids aperture 172 and at least one gas aperture 174. In an exemplary embodiment, the solids aperture 172 is located at a height below the gas aperture 174. As is known in the art, fluidized solids maintained in the fluidizing/transport bed 152, and the solids column within the feedpipe 150 act as a seal preventing backflow from downstream flow. As is also known in the art, solids flow through the apertures and into the discharge pipes 166, 168 (i.e., solids flow rate) is regulated based on the number and arrangement of rows of solids apertures 172, the area of such apertures, and the velocity of fluidizing/transport gas supplied to the bed 152, as is disclosed in the '830 patent and further discussed therein.

For example, in an exemplary embodiment, a flow rate of solids into the discharge pipes 166,168 of the seal mechanism is based upon a velocity of the fluidizing gas and/or the transport gas supplied from the fluidizing gas source 158 and/or the transport gas source 164, respectively. In general, the flow of solids is related to the velocity of the fluidizing gas and/or the transport gas, e.g., increasing the velocity of the fluidizing gas and/or the transport gas using valves 159 causes a corresponding increase in the flow rate of solids through the seal mechanism (via more exposed solids apertures 172). Therefore, a desired flow rate of solids, based upon operation of a power plant (not shown), is maintained by adjusting the velocity of the fluidizing gas and/or the transport gas.

Similarly, and as discussed in detail hereinafter, the ratio of solids entering discharge pipe 166 to discharge pipe 168 may be controlled by adjusting the amount/velocity of fluidizing and/or transport air provided to the transport and fluidizing zones associated with the respective discharge pipes 166, 168. For example, if it is desired that more solids be diverted to the discharge pipe 166, then the flow of air into the fluidizing zone 158 and/or transport zone 160 associated with the discharge pipe 166 may be increased (relative to the flow or air into the zones associated with discharge pipe 169) using, for example, valve 159. This increase in air flow causes a corresponding increase in solids flow into the discharge pipe 166.

In other embodiments, the flow rate of solids into each discharge pipe 166, 168 is based upon the total number of solids apertures exposed to the solids. More specifically, the flow rate of solids is substantially proportional to the total number solid apertures 172 exposed to the solids; increasing the total number of solids apertures 172 exposed to the solids increases the flow rate of solids through the discharge pipes 166, 168. Therefore, the desired flow rate of solids, based upon operation of a transport system (not shown) having the seal mechanism, is maintained by adjusting the bed expansion height with fluidizing gas and gas injection to the feed pipe through the total number of solids apertures 172. In still another exemplary embodiment, the flow rate of solids is based upon a height of a bed expansion line of relative to heights of the solids apertures 172, as more particularly discussed in the '830 patent.

Figure 3:
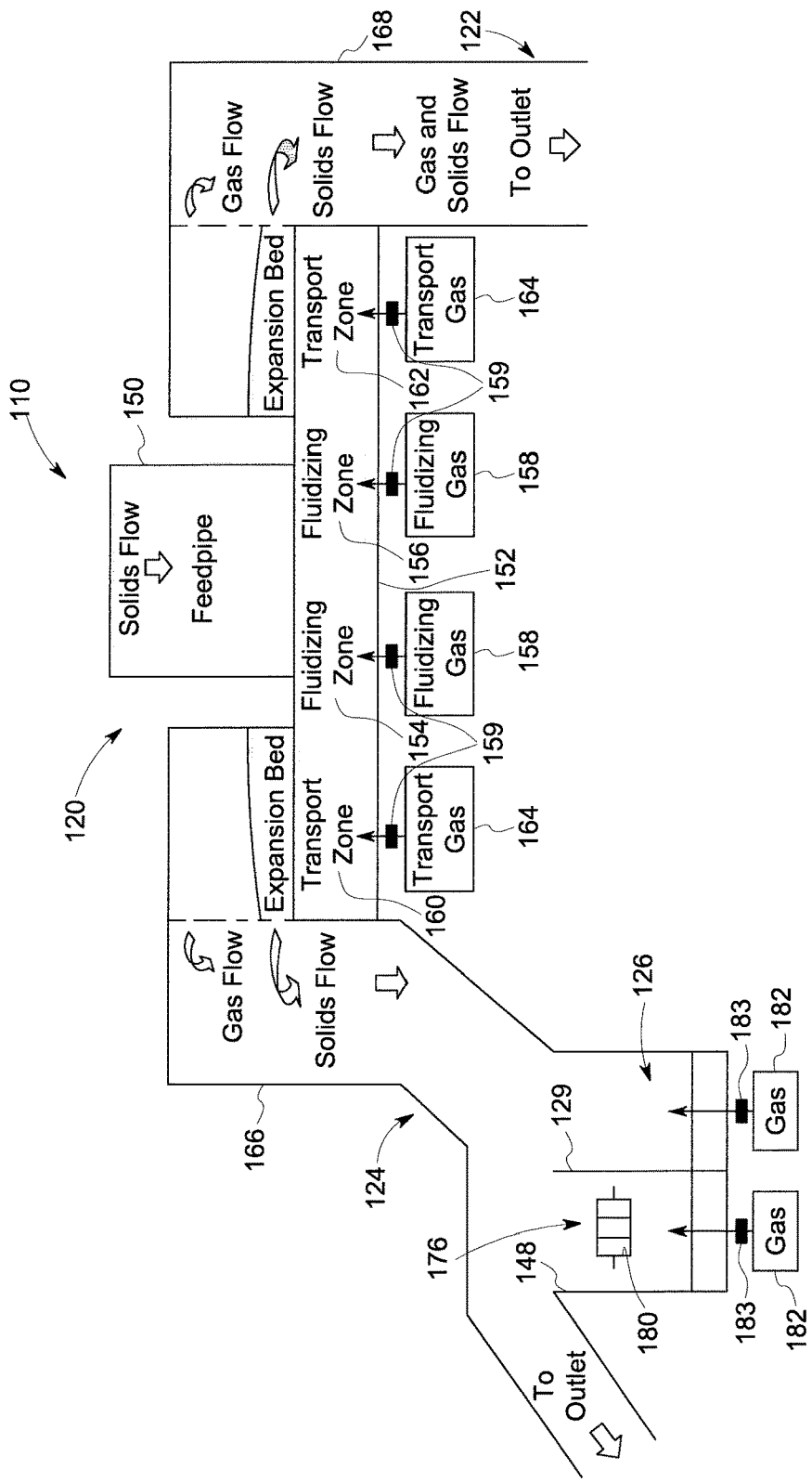
FIG. 3 is a schematic, side elevational of area A of the integrated system for controlling the flow direction, flow rate and temperature of solids of FIG. 1, illustrating a first control subassembly.

Turning now to FIG. 3, a detailed, schematic illustration of the first control subassembly 110 is shown. As illustrated, discharge pipe 168 of the first seal mechanism 120 is fluidly coupled to the bypass pathway 122, and the discharge pipe 166 is fluidly coupled to the heat exchange pathway 124. The amount of solids entering the heat exchange pathway 124 is first controlled by the gas velocity in transport zone 160 and 162. In general, higher gas velocity promotes greater solids flow. As shown, the bypass pathway 122 leads directly to outlet 118. The heat exchange pathway 124 includes a fluidized bed heat exchanger through which solids are configured to pass, to facilitate the mixing, cooling or heating of such solids, before being passed to the outlet 118. As shown therein, the heat exchange pathway 124 includes empty chamber 126 and a heat exchange chamber 176 separated by weir 129. The heat exchange chamber 176 includes a heat exchanger 180 associated therewith. Each chamber 126, 176 is supplied with fluidizing and/or transport gas from a fluidizing/transport gas source 182, which may be the same or different from gas sources 158 and 164. Each of the fluidizing gas sources 182 may be configured with a control device such as a damper or valve 183 that allows for control over the flow rate and/or velocity of gas entering the chambers 126, 176, respectively.

Solids entering the heat exchange pathway 124 may be adjustably cooled (or heated) to a desired degree by controlling the velocity of gas provided to the empty chamber 126 and the heat exchange chamber 176. For example, solids flowing into the empty chamber 126 may be slumped by decreasing the flow of gas from source 182 into the empty chamber 126, or passed quickly to the heat exchange chamber 176 over the weir 129 by increasing the flow of gas into the empty chamber 126. Likewise, once solids enter the heat exchange chamber 176, the velocity of gas provided to the chamber 176 may be controlled in order to either increase or decrease the mixing of such solids and gas within the chamber 176 (which increases or decreases the amount of heat transfer that takes place). Once the solids exit the heat exchange pathway 124, they are passed to the outlet 118.

Figure 4:
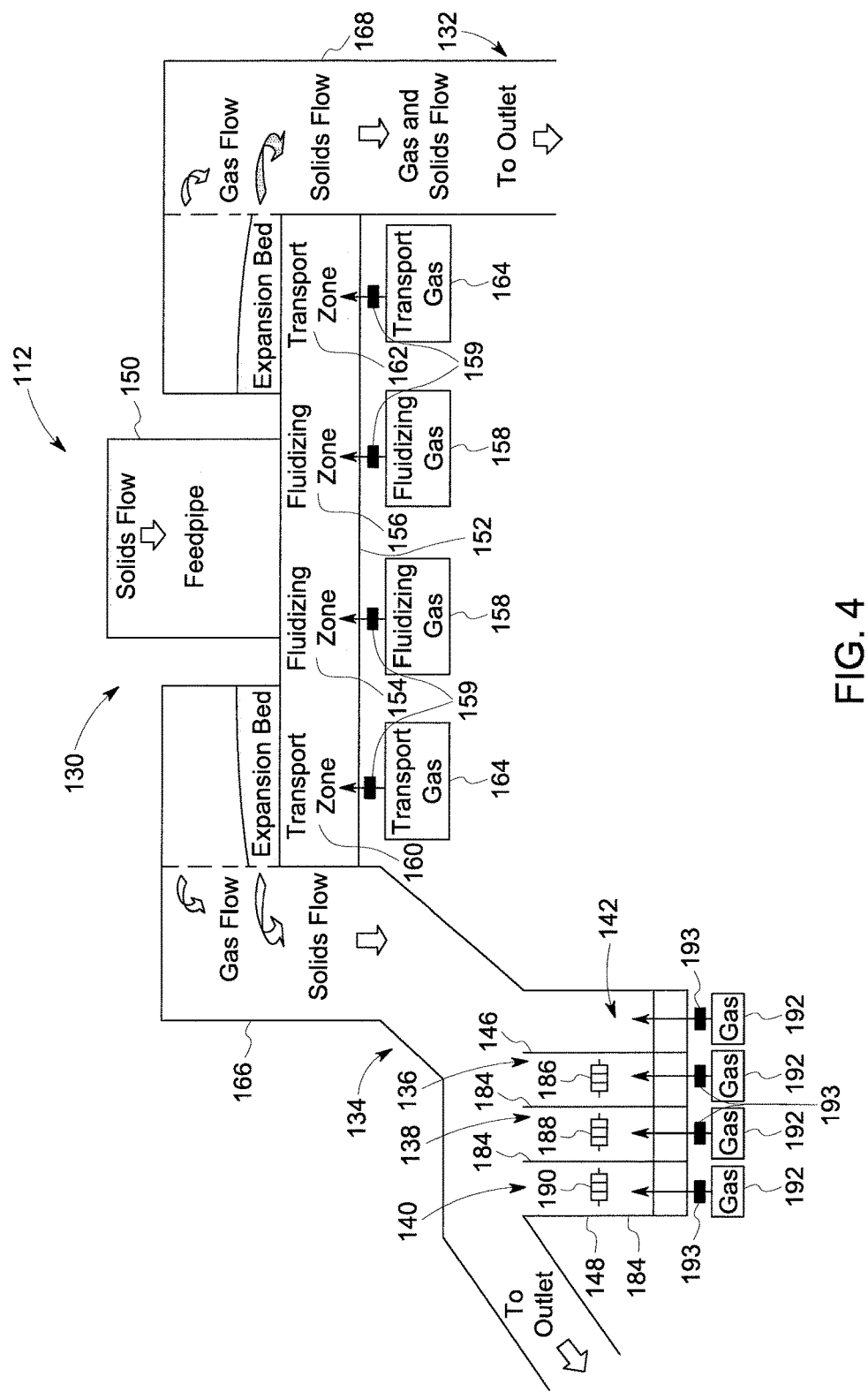
FIG. 4 is a schematic, side elevational view of area B of the integrated system for controlling the flow direction, flow rate and temperature of solids of FIG. 1, illustrating a second control subassembly.

Turning now to FIG. 4, a detailed, schematic illustration of the second control subassembly 112 is shown. The second control subassembly 112 is configured similarly to the first control subassembly 110, but instead of a single fluidized bed heat exchanger, uses a series of fluidized bed heat exchangers to more precisely control the temperature of solids. As illustrated in FIG. 4, discharge pipe 168 of the second seal mechanism 130 is fluidly coupled to the bypass pathway 132, and the discharge pipe 166 is fluidly coupled to the heat exchange pathway 134. As shown, the bypass pathway 132 leads directly to outlet 118. The heat exchange pathway 134 includes a plurality of fluidized bed heat exchangers through which solids are configured to pass, to facilitate the cooling or heating of such solids, before being passed to the outlet 118. As shown therein, the heat exchange pathway 134 includes empty chamber 142 and a series of heat exchange chambers 136, 138, 140. The heat exchange chambers are separated from the empty chamber 142 by weir 146, which the heat exchange chambers are separated from one another by weirs 184. The heat exchange chambers 136, 138, 140 each include a respective heat exchanger 186, 188, 190 associated therewith. Each chamber 146, 136, 138, 140 is supplied with gas from a gas source 192, which may be the same or different from gas sources 158, 164, 182. As illustrated, each of the gas sources 192 may be configured with a control device such as a damper or valve 193 that allows for control over the flow rate and/or velocity of gas entering the chambers 136, 138, 140, 142, respectively.

Solids entering the heat exchange pathway 134 may be adjustably cooled (or heated) to a desired degree by controlling the velocity of fluidized gas provided to the empty chamber 146 and the heat exchange chambers 136, 138, 140. For example, solids flowing into the empty chamber 142 may be slumped by decreasing the flow of gas from source 192 into the empty chamber 142, or passed quickly to the first heat exchange chamber 136 over the first weir 146 by increasing the flow of gas into the empty chamber 142. Likewise, once solids enter the first heat exchange chamber 136, the velocity of gas provided to the chamber 136 may be controlled in order to either increase or decrease the mixing of such solids and gas within the chamber 136 (which increases or decreases the amount of heat transfer that takes place). Similar slumping or flow of the solids within or out of the chambers 138, 140 is controlled in the same manner, i.e., by increasing or decreasing the flow of gas within each such chamber 138, 140. Once the solids exit the heat exchange pathway 134, they are passed to the outlet 118.

In other embodiments, the heat exchange pathway 134 may be configured to provide a serpentine-like flow of solids through the pathway. For example, in an embodiment, weir 146 may have an aperture or space at the bottom thereof that allows solids to flow under the weir 146 (into the chamber 136 into the bottom thereof). Weir 184 between chambers 138 and 140 may be similarly configured. In operation, therefore, solids may flow into empty chamber 142, beneath weir 146, and into heat exchange chamber 136. The solids may then flow out of chamber 136 over weir 184 and into chamber 138. Once entering chamber 138, the solids may flow under weir 184 into chamber 190, and ultimately over weir 148 and to outlet 118. In this embodiment, by entering chambers 136, 140 at the bottom thereof (under the respective weirs), the solids are permitted to more closely interact with the heat exchangers 186, 190 associated therewith (such as be passing through the heat exchangers) in order to better facilitate heat transfer.

In other embodiments, each of the heat exchange chambers 136, 138, 140 may have a width wherein different zones (indicated by the dashed lines in FIG. 1.) are defined along the width. The different zones may be provided with differing amounts of transport air in order to selectively pass or slump the solids within the respective chambers to more precisely control the temperature of the solids.

In connection with the above, each of the inlets of respective control subassemblies 110, 112 may be configured with a temperature sensor configured to detect the inlet temperature of the solids from the first and second source. In an embodiment, each of the heat exchange pathways 124, 134 may also be configured with one or more temperature sensors for detecting a temperature of solids at various points as they flow therethrough. Likewise, in an embodiment, the apparatus 100 may include a temperature sensor associated with the outlet 118 for detecting a temperature of the solids at the outlet 118. Moreover, the system of the present invention may include a control unit 200, as shown in FIG. 1, electrically or communicatively coupled to the apparatus 100. The control unit 200 is configured to receive temperature data for the solids, including the inlet temperature of the solids and the outlet temperature of the solids, and to store a target temperature in a database. Moreover, the control unit 200 is configured to control the supply of fluidizing gas and transport gas provided to the bed 152 and the empty chambers 126, 142 and heat exchange chambers 176, 136, 138, 140, as well as control operation of the heat exchangers within the respective heat exchange passageways. In connection with the above, the control unit 200 is configured to control the amount or velocity of transport gas and/or fluidizing gas provided to the respective transport zones in 160, 162 and/or fluidizing zones 154, 156 of the bed in dependence upon the detected inlet temperature of the solids in relation to the target temperature, as well as to the heat exchange chambers, as discussed in detail below. Such control may be provided by controlling the position of valves 159, 183 and 193.

Referring to FIGS. 1 and 2, in operation, solids from a first source are provided to the first control subassembly 110 through feedpipe 150. As the solids enter the feedpipe 150, or prior thereto, a temperature of the solids may be detected. Once entering the seal mechanism 120 the solids are provided to the fluidizing and/or transport bed 152, where they mix with fluidizing gas supplied from one or more of the fluidizing gas sources 158 and/or transport gas supplied from one or more of the transport gas sources 164 to form fluidized solids in the fluidizing zones of the bed 152. Depending on the inlet temperature of the solids in relation to a target temperature of the solids, they are either passed to the bypass pathway 122 or to the heat exchange pathway 124. For example, if the temperature of the solids is close to the target temperature, the velocity of fluidizing gas and/or transport gas provided to the fluidizing zone 154 and transport zone 160 associated with the heat exchange pathway 124 is reduced, while the velocity of fluidizing gas and/or transport gas provided to the fluidizing zone 156 and transport zone 162 associated with the bypass pathway 122 is increased in order to direct the flow of solids into discharge pipe 168 leading to the bypass pathway 122 and ultimately to outlet 118 for subsequent use (rather than the discharge pipe 166 leading to the heat exchange pathway 124). As used herein, "inlet temperature" is a temperature of the solids upstream from the bed 152. As used herein, "target temperature" is a predetermined, optimal temperature or temperature range of the solids required for subsequent use of the solids.

If, however, the temperature of the solids is higher than the target temperature, the velocity (or amount/flow rate) of fluidizing gas and/or transport gas provided to the fluidizing zone 154 and transport zone 160 associated with the heat exchange pathway 124 is increased, while the velocity (or amount/flow rate) of fluidizing gas and/or transport gas provided to the fluidizing zone 156 and transport zone 162 associated with the bypass pathway 122 is reduced in order to direct the flow of solids into discharge pipe 166 leading to the heat exchange pathway 124. As will be readily appreciated, therefore, the velocity of gas provided to the respective fluidizing zones 154, 156 and transport zones 160, 162 may be controlled in order to direct the flow of solids into multiple paths (i.e., a bypass path or heat exchange path).

Once the solids are passed into the heat exchange pathway 124, the flow and temperature of such solids may be controlled by controlling the respective slumping or fluidizing of the solids within the empty chamber 126 and the heat exchange chamber 176, as discussed above. In particular, if the temperature of the solids must be substantially reduced to meet the predetermined target temperature, the flow of fluidizing gas provided to the heat exchange chamber 176 may be increased in order to increase the mixing of the solids and gas within the chamber 176, and hence the heat transfer rate from solids/gas to the heat exchanger. While in the heat exchange chamber 176, heat is transferred from the solids to the fluid flowing through the heat exchanger 180 in order to reduce the temperature of the solids to the target temperature. The solids may then be passed to the outlet 118 by the fluidizing gas or other means, for subsequent use in a chemical process.

Similarly, as shown in FIG. 4, and simultaneously with flow and temperature control of solids within the first control subassembly 110, solids from a second source may be provided to the second control subassembly 112 through solids feed-pipe 150 of the second seal mechanism 130. As the solids enter the feed-pipe 150, or prior thereto, a temperature of the solids may be detected. Once entering the seal mechanism 130 the solids are provided to the dual fluidizing and/or transport bed 152, where they mix with fluidizing gas supplied from one or more of the fluidizing gas sources 158 and/or transport gas supplied from one or more of the transport gas sources 164 to form fluidized solids in the fluidizing zones of the bed 152. Depending on the inlet temperature of the solids in relation to a target temperature of the solids, they are either passed to the bypass pathway 132 or to the heat exchange pathway 134. For example, if the temperature of the solids is close to the target temperature, the velocity of fluidizing gas and/or transport gas provided to the fluidizing zone 154 and transport zone 160 associated with the heat exchange pathway 134 is reduced, while the velocity of fluidizing gas and/or transport gas provided to the fluidizing zone 156 and transport zone 162 associated with the bypass pathway 132 is increased in order to direct the flow of solids into discharge pipe 168 leading to the bypass pathway 132 and ultimately to outlet 118 for subsequent use (rather than the discharge pipe 166 leading to the heat exchange pathway 134).

If, however, the temperature of the solids is higher than the target temperature (or, in other embodiments, lower than the target temperature), the velocity of fluidizing gas and/or transport gas provided to the fluidizing zone 154 and transport zone 160 associated with the heat exchange pathway 134 is increased, while the velocity of fluidizing gas and/or transport gas provided to the fluidizing zone 156 and transport zone 162 associated with the bypass pathway 132 is reduced in order to direct the flow of solids into discharge pipe 166 leading to the heat exchange pathway 134. As indicated above, therefore, the velocity of gas provided to the respective fluidizing zones 154, 156 and transport zones 160, 162 may be controlled in order to direct the flow of solids into multiple paths (i.e., a bypass path 132 or heat exchange path 134).

Once the solids are passed into the heat exchange pathway 124, the flow and temperature of such solids may be controlled by controlling the respective slumping or fluidizing of the solids within the empty chamber 126 and the heat exchange chambers 136, 138, 140, as discussed above. In particular, if the temperature of the solids must be substantially reduced to meet the predetermined target temperature, the flow of fluidizing gas provided to one or more of the heat exchange chambers 136, 138, 140 may be decreased in order to increase the residence time of the solids within one or more of the chambers 136, 138, 140. While in the heat exchange chambers 136, 138, 140, heat is transferred from the solids to the fluid flowing through the heat exchangers 186, 188, 190 in order to reduce the temperature of the solids to the target temperature. The solids may then be passed to the outlet 118 by the fluidizing gas, for subsequent use in a chemical process. Use of multiple heat exchangers rather than a single heat exchanger allows the temperature of the solids to be more precisely controlled while keeping the solids moving through the heat exchange pathway 134.

In an embodiment, the empty chambers 126, 146 are provided to help prevent the backup of fluidized solids and to aid in solids fluidization. In certain embodiments, the empty chambers 126, 146 may be omitted from the apparatus 100. While the apparatus 100 is illustrated as having two discharge flow paths (i.e., to the bypass pathway or the heat exchange pathway), the present invention is not limited in this regard. In particular, the seal mechanism of each control subassembly may include any number of discharge pipes or pathways, each having a fluidizing zone and transport zone supplied with fluidizing gas and transport gas, respectively, associated therewith. Accordingly, the velocity of transport gas supplied to each transport zone may be adjusted in order to selectively control the flow of solids into one or more pathways (i.e., in one or more directions). Indeed, rather than using mechanical valves or the like to control the direction and flow rate of solids along multiple pathways, transport gas may be utilized to selectively move the solids through the respective bypass or heat exchange loops, which is much less costly, more precise and much easier to implement that mechanical devices.

By combining a seal mechanism having two or more discharge pathways (i.e., one or more heat exchange pathways and a bypass pathway), the apparatus 100 provides the flexibility needed to meet a wide range of operating conditions and is effective in distributing solids at a controlled direction, flow rate and temperature. In particular, the apparatus may be designed to have any number of subassemblies configured to accept any number of source flows of solids having a variety of different inlet temperatures and pressures. The apparatus 100 is operable to control the flow of solids through the apparatus in order that the temperature of the solids at the outlet is precisely controlled, regardless of the temperature of the solids at the inlet.

In an embodiment, rather than employing weirs within the heat exchange pathways to separate the chambers within the respective heat exchange pathways, a large gap defining a non-fluidizing zone may be utilized to effectively separate the chambers from one another.

Figure 5:
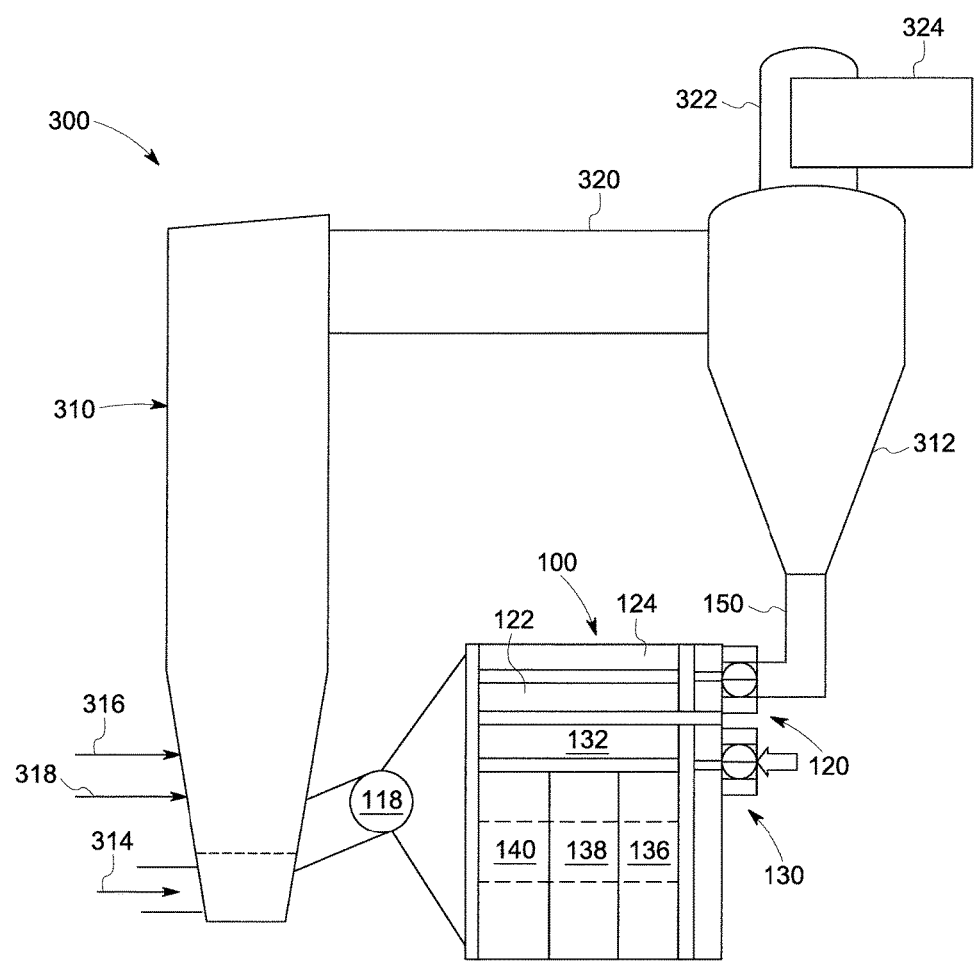
FIG. 5 is a schematic illustration of a fluidized bed combustion power plant utilizing the integrated flow direction, flow rate and temperature control apparatus of FIG. 1, according to an embodiment of the invention.

Referring to FIG. 5, a combustion power plant 300 and, more particularly, a fluidized bed combustion (FBC) power plant 300 includes the combustor 310, the solids separator 312, e.g., the cyclone separator 312, and the integrated flow direction, flow rate and temperature control apparatus 100 according to an exemplary embodiment. The furnace 310 of the FBC power plant is supplied with primary gas (PA) 314, secondary gas (SA) 316 and fuel 318. In addition, other materials such as limestone (not shown), for example, may be supplied to the furnace 310, but alternative exemplary embodiments are not limited to the foregoing components or materials.

In an exemplary embodiment, the combustor 310 is an FBC-type combustor such as a circulating fluidized bed (CFB) combustor, but alternative exemplary embodiments are not limited thereto. For example, the combustor 310 may be a bubbling fluidized bed (BFB) combustor, a moving fluidized bed combustor or a chemical looping combustor.

As the combustor 310 burns the fuel 318, combustion products, including gases and solids, exit the combustor 310 via a flue 320 and enter the cyclone separator 312. The cyclone separator 312 separates the solids and supplies the solids to the feedpipe 150 of the seal mechanism 120 (or seal mechanism 130). The gases exit the cyclone separator 312 via a central duct 322 and are delivered to other components of the FBC power plant 300 such as atmosphere control equipment (not shown) via a tangential duct 324.

The solids separated by the cyclone separator 312 are delivered to the feedpipe 150 of the seal mechanism 120. In an exemplary embodiment, the solids are then returned to the combustor 310 via the outlet 118 of the apparatus 100, as described above in greater detail with reference to FIGS. 1-4.

As alluded to above, the integrated flow direction, flow rate and temperature control apparatus 100 may also be incorporated into a chemical looping power generation system of the type known in the art. For example, the input to seal mechanism 120 could be an oxidizer loop of a chemical looping system. In such system, the apparatus 100 may be utilized to control the temperature and flow rate of solids from the oxidizer of the system to the reducer. Indeed, the apparatus 100 may be utilized to selectively cool oxidized solids to a temperature required to facilitate the chemical reaction within the reducer.

Thus, the integrated flow path, flow rate and/or temperature control apparatus 100 according to an exemplary embodiment provides a multiple orifice exit design and a method for controlling a flow rate of solids. Therefore, the apparatus has a substantially increased or effectively improved solids flow control range, as well as increased precision of regulation of the solids flow control range. In addition, the apparatus has increased steady state seal maintainability, decreased flue gas escape, decreased solids loss from the system, improve chemical reactions, and increased turndown ratio. The apparatus 100 also provides for precise temperature control of the solids passing therethrough, which facilitates more efficient combustion or better control of chemical reactions, and power generation, as a whole.

It will be noted that while exemplary embodiments have been described with reference to an apparatus including a dual-fluidized bed seal mechanism associated with fluidized bed combustion power plants such as circulating fluidized bed boilers and chemical process reactors, alternative exemplary embodiments are not limited thereto. Rather, an apparatus according to other embodiments may be utilized in any type of chemical process plant including power plants, but not limited to, CFB, BFB, transport bed or combined CFB, BFB and transport bed and other variations of fluidized bed process plants, as well as conventional power plants.

In addition, while the apparatus 100 has been described to control the process of a power plant, the present invention contemplates that the apparatus may be used with any process needing to control solids flow rate, pressure, flow direction and/or temperature within such a process system.

In an embodiment, an apparatus for controlling a flow direction, flow rate and/or temperature of a material is provided. The apparatus includes an inlet for receiving the material from a source, and a seal mechanism connected to the inlet, the seal mechanism having a fluidizing bed configured to receive the material from the inlet, a first discharge passageway and a second discharge passageway. The fluidizing bed includes a first transport zone associated with the first discharge passageway and a second transport zone associated with the second discharge passageway, wherein the first and second transport zones are configured to receive transport gas from a transport gas source. The transport gas is controllable to selectively divert a flow of the material into the first discharge passageway and the second discharge passageway. In an embodiment, the apparatus may further include a bypass pathway fluidly coupled to the first discharge passageway, and a heat exchange pathway fluidly coupled to the second discharge passageway. The heat exchange pathway may include at least one heat exchanger associated therewith for controlling a temperature of the material. In an embodiment, the heat exchange pathway includes a heat exchange chamber housing the heat exchanger and an empty chamber upstream from the heat exchange chamber, the heat exchange chamber and the empty chamber being separated by a weir. In an embodiment, the heat exchange chamber and the empty chamber are supplied with fluidizing gas for selectively passing the material through, or slumping the material within, each chamber. In an embodiment, the apparatus may also include an outlet fluidly coupled to the heat exchange pathway and the bypass pathway. In an embodiment, the apparatus may include a first orifice plate adjacent to the first discharge passageway and separating the first discharge passageway from the fluidizing bed, and a second orifice plate adjacent to the second discharge passageway and separating the second discharge passageway from the fluidizing bed. The first orifice plate and the second orifice plate each have a plurality of apertures disposed at a height above the bed which allow the transport of fluidized material and gas through the plurality of apertures of the orifice plate from the bed to the first and second discharge passageways, respectively. In an embodiment, the flow rate of the material into the first and second passageways is controlled based on at least one of a total number of the plurality of apertures, a diameter of an aperture of the plurality of apertures, a cross-sectional shape of an aperture of the plurality of apertures, an area of an aperture of the plurality of apertures and a height of an aperture of the plurality of apertures. In an embodiment, the apparatus is configured to control the flow direction, the flow rate and the temperature of the material in a chemical process plant. The chemical process plant may include at least one of a fluidized bed reactor, a circulating fluidized bed reactor, a bubbling fluidized bed reactor, a moving fluidized bed, and a transport reactor, or a combination of the above. In an embodiment, the fluidizing bed is configured to fluidize the material using a gas supplied from a fluidizing gas source. In an embodiment, the material is one of a solids fuel, a reactant and inert particles.

In another embodiment, an apparatus for controlling flow of solids in a chemical process plant is provided. The apparatus includes a solids feed-pipe having an upper end which receives solids of the power plant, and a lower end, a bed fluidly coupled to the lower end of the solids feed-pipe and configured to receive the solids from the solids feed-pipe, the bed including a first transport zone and a second transport zone, each transport zone being configured to receive transport gas from a transport gas source, a first discharge passageway adjacent to the first transport zone, and a second discharge passageway adjacent to the second transport zone. Fluidized solids are transported to the first discharge passageway and the second discharge passageway using the transport gas supplied to the first and second transport zones. In an embodiment, the apparatus further includes a bypass pathway fluidly coupled to the first discharge passageway, and a heat exchange pathway fluidly coupled to the second discharge passageway, the heat exchange pathway having at least one heat exchanger associated therewith for controlling a temperature of the solids. In an embodiment, the at least one heat exchanger is a plurality of heat exchangers, each heat exchanger being associated with a separate heat exchange chamber within the heat exchange pathway. In an embodiment, the apparatus includes an empty chamber within the heat exchange pathway and positioned upstream from the plurality of heat exchange chambers. The heat exchange chambers and the empty chamber are supplied with fluidizing gas for selectively passing the material through, or slumping the material within, each chamber to heat or cool the fluidized solids to a target temperature. In an embodiment, the apparatus may also include an outlet fluidly coupled to the heat exchange pathway and the bypass pathway for receiving the fluidized solids at approximately the target temperature. In an embodiment, the power plant includes at least one of a fluidized bed combustion power plant, a circulating fluidized bed boiler, a bubbling fluidized bed boiler, a moving fluidized bed boiler and a chemical looping combustor. In an embodiment, the feedpipe receives the solids from a first source and the apparatus further includes a second feedpipe having an upper end which receives solids of the power plant from a second source, a second bed fluidly coupled to the lower end of the second feedpipe and configured to receive the solids from the second feedpipe, the second bed including a first transport zone and a second transport zone, each transport zone being configured to receive transport gas from the transport gas source, a second bypass pathway in communication with the first transport zone of the second bed, and a second heat exchange pathway in communication with the second transport zone of the second bed. Fluidized solids from the second source are transported to the second bypass pathway and the second heat exchange pathway using the transport gas supplied to the first and second transport zones of the second bed. In an embodiment, the second heat exchange pathway and the second bypass pathway are fluidly coupled to the outlet.

In yet another embodiment, a method of controlling a flow direction, flow rate and/or temperature of solids is provided. The method includes the steps of, at a bed, receiving solids from a source, fluidizing the solids in the bed using a gas, and selectively transporting the fluidized solids to a first discharge passageway and a second discharge passageway by controlling a supply of transport gas to a first fluidizing zone of the bed associated with the first discharge passageway and a second fluidizing zone of the bed associated with the second discharge passageway. In an embodiment, the first discharge passageway is fluidly coupled to a bypass pathway, the second discharge passageway is fluidly coupled to a heat exchange pathway having at least one heat exchanger associated therewith for controlling a temperature of the fluidized solids, and the method includes the step of varying at least one of an amount and velocity of the transport gas provided to at least one of the first fluidizing zone and the second fluidizing zone in dependence upon an inlet temperature of the solids. In an embodiment, the method may also include the step of, if the inlet temperature of the solids is greater than a target temperature, increasing at least one of the amount and velocity of the transport gas provided to the second fluidizing zone to transport the fluidized solids into the heat exchange passageway to decrease the temperature of the fluidized solids. In an embodiment, the method may also include the step of, if the inlet temperature of the solids is approximately equal to or less than a target temperature, increasing at least one of the amount and velocity of the transport gas provided to the first fluidizing zone to transport the fluidized solids into the bypass passageway. In an embodiment, in addition to solids/gas temperature control, the same concept can be used in controlling a chemical reaction for specific materials/solids at a desired temperature and pressure. For example, the flow rate of solids through the system may be precisely controlled in the various manners discussed above in order to more precisely one or more chemical reactions within the system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An apparatus for controlling flow of a material, comprising:
    a first control subassembly having a first inlet to receive a respective first flow of solids from a first source;
    and a second control subassembly having a second inlet to receive a second flow of solids from a second source; and
        a first seal mechanism fluidly coupled to the first inlet, the first seal mechanism having a first fluidizing bed configured to receive the the first flow of solids from the first inlet;
        a second seal mechanism fluidly coupled to the second inlet, the second seal mechanism having a second fluidizing bed configured to receive the second flow of solids from the second inlet;
        a first discharge passageway and a second discharge passageway fluidly coupled to the first fluidizing bed; and a bypass pathway fluidly coupled to the first discharge passageway; and a heat exchange pathway fluidly coupled to the second discharge passageway, the heat exchange pathway having at least one heat exchanger associated therewith for controlling a temperature of the material;
        a third discharge passageway and a fourth discharge passageway fluidly coupled to the second fluidizing bed;
        wherein the first, second, third, and fourth passageways are fluidly coupled with a common outlet;
        wherein the first fluidizing bed includes a first transport zone associated with the first discharge passageway and a second transport zone associated with the second discharge passageway, the first and second transport zones being configured to receive a first transport gas from a transport gas source;
        wherein the second fluidizing bed includes a third transport zone associated with the third discharge passageway and a fourth transport zone associated with the fourth discharge passageway, the third and fourth transport zones being configured to receive a second transport gas from a transport gas source; and
        wherein the first transport gas is controllable to selectively divert a flow of the material into the first discharge passageway and the second discharge passageway.

2. The apparatus of claim 1, wherein:
the heat exchange pathway includes a heat exchange chamber housing the heat exchanger and an empty chamber upstream from the heat exchange chamber, the heat exchange chamber and the empty chamber being separated by a weir.

3. The apparatus of claim 2, wherein:
the heat exchange chamber and the empty chamber are supplied with fluidizing gas for selectively passing the material through, or slumping the material within, each chamber.

4. The apparatus of claim 2, wherein:
the common outlet is fluidly coupled to the heat exchange pathway and the bypass pathway.

5. The apparatus of claim 1, further comprising:
a first orifice plate adjacent to the first discharge passageway and separating the first discharge passageway from the fluidizing bed;
a second orifice plate adjacent to the second discharge passageway and separating the second discharge passageway from the fluidizing bed;
wherein the first orifice plate and the second orifice plate each have a plurality of apertures disposed at a height above the bed, the plurality of apertures allowing transport of fluidized material and gas through the plurality of apertures of the orifice plate from the bed to the first and second discharge passageways, respectively.

6. The apparatus of claim 5, wherein:
the flow rate of the material into the first and second passageways is controlled based on at least one of a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

7. The apparatus of claim 1, wherein:
the apparatus is configured to control the flow direction, the flow rate and the temperature of the material in a chemical process plant; and
the chemical process plant includes at least one of a fluidized bed reactor, a circulating fluidized bed reactor, a bubbling fluidized bed reactor, a moving fluidized bed, and a transport reactor.

8. The apparatus of claim 1, wherein:
the fluidizing bed is configured to fluidize the material using a gas supplied from a fluidizing gas source.

9. The apparatus of clam 1, wherein:
the material is one of a solids fuel, a reactant, and inert particles.

10. An apparatus for controlling flow of solids in a chemical process plant, comprising:
    a solids feed-pipe having an upper end which receives solids from a first upstream source, and a first lower end;

a bed fluidly coupled to the lower end of the solids feed-pipe and configured to receive the solids from the solids feed-pipe, the bed including a first transport zone and a second transport zone, each transport zone being configured to receive transport gas from a transport gas source;

a first discharge passageway adjacent to the first transport zone; and a second discharge passageway adjacent to the second transport zone; wherein fluidized solids are transported to the first discharge passageway and the second discharge passageway using the transport gas supplied to the first and second transport zones;

a second solids feed-pipe having an upper end which receives solids of the power plant from a second upstream source and a second lower end;

a second bed fluidly coupled to the second lower end of the second solids feed-pipe and configured to receive the solids from the second feedpipe, the second bed including a first transport zone and a second transport zone, each transport zone being configured to receive transport gas from the transport gas source;

a second bypass pathway in communication with the first transport zone of the second bed;

a second heat exchange pathway in communication with the second transport zone of the second bed; and an outlet fluidly coupled to the heat exchange pathway and the bypass pathway for receiving the fluidized solids;

wherein fluidized solids from the second upstream source are transported to the second bypass pathway and the second heat exchange pathway using the transport gas supplied to the first and second transport zones of the second bed.

11. The apparatus of claim 10, further comprising:
a bypass pathway fluidly coupled to the first discharge passageway; and a heat exchange pathway fluidly coupled to the second discharge passageway, the heat exchange pathway having at least one heat exchanger associated therewith for controlling a temperature of the solids.

12. The apparatus of claim 11, wherein:
the at least one heat exchanger is a plurality of heat exchangers, each heat exchanger being associated with a separate heat exchange chamber within the heat exchange pathway.

13. The apparatus of claim 12, further comprising:
an empty chamber within the heat exchange pathway and positioned upstream from the plurality of heat exchange chambers;
wherein the heat exchange chambers and the empty chamber are supplied with fluidizing gas for selectively passing the material through, or slumping the material within, each chamber to heat or cool the fluidized solids to a target temperature.

14. The apparatus of claim 10, wherein:
the chemical process plant includes at least one of a fluidized bed, a circulating fluidized bed, a bubbling fluidized bed, a moving fluidized bed, and a transport reactor.

15. The apparatus of claim 10, wherein:
the second heat exchange pathway and the second bypass pathway are fluidly coupled to the outlet.

16. A method of controlling a flow of solids, comprising the steps of:
receiving at a first bed solids from a first source at a first inlet;
receiving at a second bed solids from a second source at a second inlet;
fluidizing the solids in the first and second bed using a gas; and
selectively transporting the fluidized solids from the first bed to a first discharge passageway and a second discharge passageway by controlling a supply of transport gas to a first fluidizing zone of the bed associated with the first discharge passageway and a second fluidizing zone of the bed associated with the second discharge passageway;
selectively transporting the fluidized solids from the second bed to a third discharge passageway and a fourth discharge passageway by controlling a supply of transport gas to a third fluidizing zone of the bed associated with the third discharge passageway and a fourth fluidizing zone of the bed associated with the fourth discharge passageway; and
directing the fluidized solids in the first, second, third, and fourth passageways to a common outlet: wherein the first discharge passageway is fluidly coupled to a bypass pathway; the second discharge passageway is fluidly coupled to a heat exchange pathway having at least one heat exchanger associated therewith for controlling a temperature of the fluidized solids; and wherein the method includes the step of varying at least one of an amount and velocity of the transport gas provided to at least one of the first fluidizing zone and the second fluidizing zone in dependence upon an inlet temperature of the solids.

17. The method according to claim 16, further comprising the step of:
if the inlet temperature of the solids is greater than a target temperature, increasing at least one of the amount and velocity of the transport gas provided to the second fluidizing zone to transport the fluidized solids into the heat exchange passageway to decrease the temperature of the fluidized solids.

18. The method according to claim 16, further comprising the step of:
if the inlet temperature of the solids is approximately equal to or less than a target temperature, increasing at least one of the amount and velocity of the transport gas provided to the first fluidizing zone to transport the fluidized solids into the bypass passageway.

19. The method according to claim 16, further comprising the step of: controlling a temperature and pressure of the solids in dependence upon a target temperature and pressure required for a desired chemical reaction.

* * * * *